US012763342B2

(12) United States Patent
Bakker

(10) Patent No.: US 12,763,342 B2
(45) Date of Patent: Oct. 13, 2026

(54) BATTERY

(71) Applicant: PHENOGY AG, ROOT (CH)

(72) Inventor: Niels Bakker, Wan Chai (HK)

(73) Assignee: PHENOGY AG, Root (CH)

( * ) Notice: Subject to any disclaimer, the term of this patent is extended or adjusted under 35 U.S.C. 154(b) by 483 days.

(21) Appl. No.: 17/619,947

(22) PCT Filed: Jun. 9, 2020

(86) PCT No.: PCT/CN2020/095032
§ 371 (c)(1),
(2) Date: Dec. 16, 2021

(87) PCT Pub. No.: WO2020/253571
PCT Pub. Date: Dec. 24, 2020

(65) Prior Publication Data

US 2022/0271300 A1 Aug. 25, 2022

(30) Foreign Application Priority Data

Jun. 19, 2019 (HK) ................................ 19125543.9

(51) Int. Cl.

| | |
|---|---|
| ***H01M 50/121*** | (2021.01) |
| ***H01M 6/32*** | (2006.01) |
| ***H01M 6/38*** | (2006.01) |
| ***H01M 50/107*** | (2021.01) |
| ***H01M 50/30*** | (2021.01) |

(52) U.S. Cl.
CPC ............... *H01M 6/38* (2013.01); *H01M 6/32* (2013.01); *H01M 50/107* (2021.01); *H01M 50/121* (2021.01); *H01M 50/30* (2021.01)

(58) Field of Classification Search
None
See application file for complete search history.

(56) References Cited

U.S. PATENT DOCUMENTS 2,783,291 A * 2/1957 Gold .................. H01M 50/609
429/116
3,376,166 A * 4/1968 Richard .................. H01M 6/38
429/116
(Continued)

FOREIGN PATENT DOCUMENTS

CN 201616475 10/2010
CN 102340011 2/2012
(Continued)

OTHER PUBLICATIONS

PCT International Search Report issued on Sep. 20, 2020 to PCT Application No. PCT/CN2020/095032.

*Primary Examiner* — Amanda J Barrow
(74) *Attorney, Agent, or Firm* — NORTON ROSE FULBRIGHT US LLP

(57) ABSTRACT

A battery including battery terminals, a battery casing, with a first and second constituent within the battery casing, and at least one barrier which restricts the first constituent from interacting with the second constituent. Upon a force being applied to a portion of the battery, the at least one barrier is configured such that the first constituent and the second constituent are able to interact with each other to provide an electrolyte within the chamber that is suitable for operation of the battery in powering the load.

10 Claims, 15 Drawing Sheets

(56) References Cited

U.S. PATENT DOCUMENTS

| | | | | | |
|---|---|---|---|---|---|
| 3,653,972 | A * | 4/1972 | Bolles | H01M 6/38 429/116 |
| 3,663,302 | A * | 5/1972 | Kaye | H01M 6/38 429/116 |
| 3,884,722 | A * | 5/1975 | Tucholski | H01M 10/283 429/185 |
| 3,904,437 | A * | 9/1975 | Specker | H01M 6/06 429/224 |
| 4,517,736 | A * | 5/1985 | Goebel | H01M 6/38 29/623.2 |
| 6,664,006 | B1 * | 12/2003 | Munshi | H01M 4/13 429/234 |
| 10,854,888 | B2 | 12/2020 | Bakker | |
| 10,916,739 | B2 | 2/2021 | Bakker | |
| 11,721,815 | B2 | 8/2023 | Bakker | |
| 2012/0148882 | A1 * | 6/2012 | Bakker | H01M 6/32 429/118 |
| 2017/0092961 | A1 * | 3/2017 | Liaw | H01M 50/394 |
| 2017/0170488 | A1 * | 6/2017 | Bakker | H01M 50/121 |
| 2019/0088955 | A1 | 3/2019 | Bakker | |

FOREIGN PATENT DOCUMENTS

| | | | | |
|---|---|---|---|---|
| CN | 106575774 | | 4/2017 | |
| CN | 109075353 | | 12/2018 | |
| CN | 109155418 | | 1/2019 | |
| JP | 2014002873 | | 1/2014 | |
| WO | WO 2014/090163 | * | 6/2014 | H01M 6/34 |
| WO | WO 2016/004843 | | 1/2016 | |
| WO | WO 2017/134507 | | 8/2017 | |
| WO | WO 2017/153831 | * | 9/2017 | H01M 6/32 |

* cited by examiner

BATTERY

CROSS-REFERENCE TO RELATED APPLICATIONS

This application is a national phase application under 35 U.S.C. § 371 of International Application No. PCT/CN2020/095032, filed Jun. 9, 2020, which claims priority to and the benefit of HK19125543, filed Jun. 19, 2019, which are hereby incorporated by reference in its entirety as if fully set forth below and for all applicable purposes.

TECHNICAL FIELD

The present invention relates to the field of batteries.

BACKGROUND OF THE INVENTION

Conventional off-the-shelf type AA and AAA batteries tend to deteriorate in performance over time during storage. This can pose a serious problem where the reliability in performance of the batteries is of critical importance—for instance, in an emergency situation where the batteries are required to power a flashlight, a radio, a mobile telephone, or other potentially life-saving electronic device.

In seeking to address this problem, water-activatable batteries have been developed which can be stored for a relatively long period of time in an inactive state (that is, where water has not yet been mixed with the electrolyte powder mixture within the battery to activate the electrolyte powder mixture) without substantial loss in performance of the battery when the battery is subsequently activated by addition of water.

However, it is perceived that certain existing water-activated batteries exhibit deficiencies in terms of their electrolyte storage capacity, efficiency of mixing of water with electrolyte inside the battery chamber, and ability to maintain electrical communication between components within the battery over time, all of which may ultimately compromise the performance of such batteries.

SUMMARY OF THE INVENTION

The present invention seeks to alleviate at least one of the problems discussed above in relation to the prior art.

The present invention may involve several broad forms. Embodiments of the present invention may include one or any combination of the different broad forms herein described.

In one broad form, the present invention provides a battery including: first and second battery terminals configured for electrical communication with a load; a battery casing having first and second end portions and a chamber disposed therein; a first constituent, a second constituent, and at least one barrier arranged in a first configuration within the chamber which restricts the first constituent from interacting with the second constituent to provide an electrolyte within the chamber that is suitable for operation of the battery in powering the load in electrical communication with the first and second battery terminals; and whereby, responsive to a force being applied to a portion of the battery, the barrier is configured for arrangement in to a second configuration from the first configuration so that the first constituent and the second constituent are able to interact with each other to provide an electrolyte within the chamber that is suitable for operation of the battery in powering the load.

Preferably, the first constituent may include a metal oxide powder.

Preferably, the second constituent may include at least one of a potassium hydroxide solution, a zinc chloride solution and water.

Preferably, the chamber may include first and second compartments configured for containing the first and second constituents respectively and wherein the barrier includes a wall separating the first and second compartments.

Preferably, the force applied to the portion of the battery so that the barrier is configured for arrangement in to the second configuration from the first configuration may include at least one of:

(a) rotating a first portion of battery casing relative to a second portion of the battery casing;
(b) sliding a first portion of battery casing relative to a second portion of the battery casing;
(c) squeezing a portion of the battery casing;
(d) deforming a portion of the battery casing;
(e) depressing a portion of the battery casing;
(f) shaking the battery casing;
(g) pulling a first portion of the battery casing away from a second portion of the battery casing; and
(h) hitting the battery casing with another object.

Preferably, at least one of the first and second constituents may include a powder composition comprising disintegrant type particles.

Preferably, the powder composition may include a compressed powder composition.

Preferably, the powder composition may be formed as at least one compressed powder ring.

Preferably, the present invention may include: a conductive layer disposed within the chamber adjacent an inner surface of the casing, the conductive layer being configured for electrical communication with the first battery terminal; a permeable separator sheet disposed within the chamber and configured to electrically separate the electrolyte when provided within the chamber from the conductive layer; and a conductive rod having a first end configured for electrical communication with the second battery terminal, and, a second end configured for contacting with the electrolyte when provided within the chamber.

Preferably, the first battery terminal and the second battery terminal may be disposed on the first and second end portions of the casing respectively.

Preferably, the present invention may include at least one air outlet channel via which air within the casing is able to be evacuated outwardly of the casing.

Preferably, the at least one air outlet channel may be disposed in at least one of the first and second end portions.

Preferably, the air outlet channel may include a diameter of approximately 0.3 mm Preferably, the present invention may include a valve operable with the at least one air outlet channel wherein said valve is configured to prevent evacuation of liquid from the chamber when air is evacuated from the chamber.

Preferably, the valve may include a membrane layer positioned on the inner surface of the casing to cover an opening in to the air outlet channel, and wherein said membrane layer includes a structure configured for preventing evacuation of liquid from the chamber when air is evacuated from the chamber.

Preferably, the present invention may include a spacing element configured for spacing at least one of the electrolyte and the conductive layer away from the second end portion.

Preferably, the spacing element may include an O-ring.

Preferably, the conductive layer may include a conductive lining that may be configured for insertion in to the casing.

Preferably, the conductive lining may include at least one passage extending through the lining to allow fluid communication through the conductive lining.

Preferably, the at least one passage may includes an elongate slot.

Preferably, the conductive layer may include zinc.

Preferably, the conductive layer may be treated with Indium.

Preferably, the casing may include an electrically-insulative material.

Preferably, the casing may include a polymeric material.

Preferably, the casing may be formed by at least one of extrusion moulding and injection moulding.

Preferably the present invention may include a spring element configured for providing electrical communication between the conductive layer and the first battery terminal.

Preferably, the spring element may include a coil spring.

Preferably, at least one of the first and second end portions of the casing may be configured for arrangement relative to the casing between at least one of a first position in which it is attached to the casing, and, a second position in which it is displaced from the casing.

Preferably the present invention may include a connecting member, wherein when the at least one of the first and second end portions is arranged in the second position so as to be displaced from the casing, the connecting member connects the at least one of the first and second end portions to the battery.

Preferably, when the at least one of the first and second end portions is arranged in the first position the at least one of the first and second end portions may be screwed on to the casing.

Preferably, when the at least one of the first and second end portions is arranged in the second position an opening in the casing may be unsealed to allow ingress of a liquid in to the chamber via the opening.

Preferably, at least one of the first and second end portions may be ultrasonically welded to the casing.

In a second broad form, the present invention provides a battery including: first and second battery terminals configured for electrical communication with a load; a battery casing having first and second end portions and a chamber configured for storing a first constituent therein; a means for allowing interaction of a second constituent with the first constituent within the chamber, wherein responsive to the second constituent being interacted with the first constituent, an electrolyte within the chamber is provided that is suitable for operation of the battery in powering the load in electrical communication with the first and second battery terminals; and wherein the electrolyte includes at least some particles that are disintegrant type particles.

Preferably, the first constituent may include a metal oxide powder.

Preferably, the first constituent may include a powder composition.

Preferably, the first constituent may include a compressed powder composition.

Preferably, the compressed powder composition may be formed as at least one compressed powder ring.

Preferably, the second constituent may include at least one of a potassium hydroxide solution, a zinc chloride solution and water.

Preferably, the present invention may include at least one barrier arranged in a first configuration within the chamber which may restrict the first constituent from interacting with the second constituent to provide the electrolyte within the chamber that is suitable for operation of the battery in powering the load in electrical communication with the first and second battery terminals; and whereby, responsive to a force being applied to a portion of the battery, the barrier may be configured for arrangement in to a second configuration from the first configuration so that the first constituent and the second constituent may be able to interact with each other to provide an electrolyte within the chamber that is suitable for operation of the battery in powering the load.

Preferably, the chamber may include first and second compartments configured for containing the first and second constituents respectively and wherein the barrier may include a wall separating the first and second compartments.

Preferably, the force applied to the portion of the battery so that the barrier is configured for arrangement in to the second configuration from the first configuration may include at least one of:

(a) rotating a first portion of battery casing relative to a second portion of the battery casing;
(b) sliding a first portion of battery casing relative to a second portion of the battery casing;
(c) squeezing a portion of the battery casing;
(d) deforming a portion of the battery casing;
(e) depressing a portion of the battery casing;
(f) shaking the battery casing;
(g) pulling a first portion of the battery casing away from a second portion of the battery casing; and
(h) hitting the battery casing with another object.

Preferably, the present invention may include: a conductive layer disposed within the chamber adjacent an inner surface of the casing, the conductive layer being configured for electrical communication with the first battery terminal; a permeable separator sheet disposed within the chamber and configured to electrically separate the electrolyte when provided within the chamber from the conductive layer; and a conductive rod having a first end configured for electrical communication with the second battery terminal, and, a second end configured for contacting with the electrolyte when provided within the chamber.

Preferably, the first battery terminal and the second battery terminal may be disposed on the first and second end portions of the casing respectively.

Preferably, the present invention may include at least one air outlet channel via which air within the casing is able to be evacuated outwardly of the casing.

Preferably, the at least one air outlet channel may be disposed in at least one of the first and second end portions.

Preferably, the air outlet channel may include a diameter of approximately 0.3 mm Preferably, the present invention may include a valve operable with the at least one air outlet channel wherein said valve may be configured to prevent evacuation of liquid from the chamber when air is evacuated from the chamber.

Preferably, the valve may include a membrane layer positioned on the inner surface of the casing to cover an opening in to the air outlet channel, and wherein said membrane layer may include a structure configured for preventing evacuation of liquid from the chamber when air is evacuated from the chamber.

Preferably, the present invention may include a spacing element configured for spacing at least one of the electrolyte and the conductive layer away from the second end portion.

Preferably, the spacing element may include an O-ring.

Preferably, the conductive layer may include a conductive lining that may be configured for insertion in to the casing.

Preferably, the conductive lining may include at least one passage extending through the lining to allow fluid communication through the conductive lining.

Preferably, the at least one passage may includes an elongate slot.

Preferably, the conductive layer may include zinc.

Preferably, the conductive layer may be treated with Indium.

Preferably, the casing may include an electrically-insulative material.

Preferably, the casing may include a polymeric material.

Preferably, the casing may be formed by at least one of extrusion moulding and injection moulding.

Preferably, the present invention may include a spring element configured for providing electrical communication between the conductive layer and the first battery terminal.

Preferably, the spring element may include a coil spring.

Preferably, at least one of the first and second end portions of the casing may be configured for arrangement relative to the casing between at least one of a first position in which it is attached to the casing, and, a second position in which it is displaced from the casing.

Preferably, the present invention may include a connecting member, wherein when the at least one of the first and second end portions is arranged in the second position so as to be displaced from the casing, the connecting member may connect the at least one of the first and second end portions to the battery.

Preferably, the at least one of the first and second end portions may be arranged in the first position the at least one of the first and second end portions may be screwed on to the casing.

Preferably, when the at least one of the first and second end portions is arranged in the second position an opening in the casing may be unsealed to allow ingress of the second constituent in to the chamber via the opening.

Preferably, at least one of the first and second end portions may be ultrasonically welded to the casing.

In another broad form, the present invention provides a device comprising an in-built battery in accordance with any one of the aforementioned broad forms, wherein the device includes at least one of a handheld and mobile electronic device for the sending and receiving of telephone calls, faxes, electronic mail, and digital data messages; a handheld and mobile computer; a personal digital assistant; a telephone; a satellite mobile telephone; a mobile telephone; a videophone; a camera; a satellite and/or Global Positioning System (GPS) navigation system; an emergency tracking beacon; an electrically-powered personal tracking device; an electrically-powered siren; a radio; an LED signaling flare; a laser signaling flare; an electrically-powered signaling flare; and an electrically-powered water filtration or purification device.

BRIEF DESCRIPTION OF THE DRAWINGS

The present invention will become more fully understood from the following detailed description of a preferred but non-limiting embodiment thereof, described in connection with the accompanying drawings, wherein.

DETAILED DESCRIPTION OF PREFERRED EMBODIMENTS

Preferred embodiments of the present invention will now be described with reference to the accompanying FIGS. 1 to 24. Certain exemplary embodiments described herein include a battery that is activatable upon ingress of a liquid into the battery casing chamber via an opening at a first end of the casing that may be selectably sealed and unsealed. When water enters the chamber it contacts with an electrolyte powder within the chamber so as to activate the electrolyte for operation of the battery. Embodiments of the present invention may comply with standard shape and dimensions of AA and AAA batteries may provide performance output which may be substantially comparable to AA and AAA type batteries.

In the description, reference to the term polymeric material may include any polymer, monopolymer, copolymer, mixed polymer blend, such as a thermoplastic material, a thermoset material, PE, PP, PVC, PVA, EVA, PEEL, PMMA or PTFE by way of example.

Figure 1:
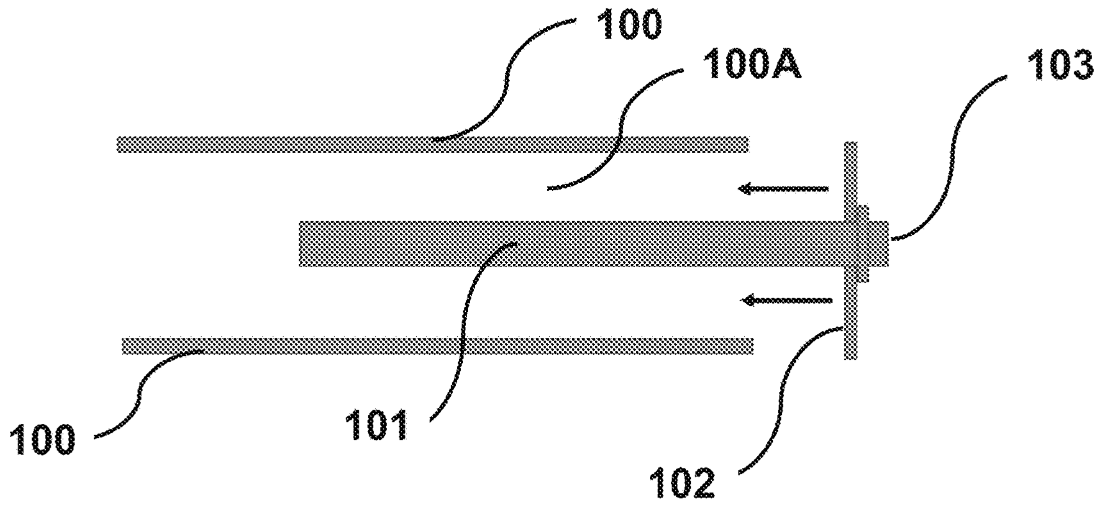
FIG. 1 depicts a side cut-away view of a first step in the production of batteries having a co-moulded carbon rod and a first end cap co-moulded together and being maneuvered into position relative to the battery casing in accordance with an embodiment of the present invention.
Figure 19:
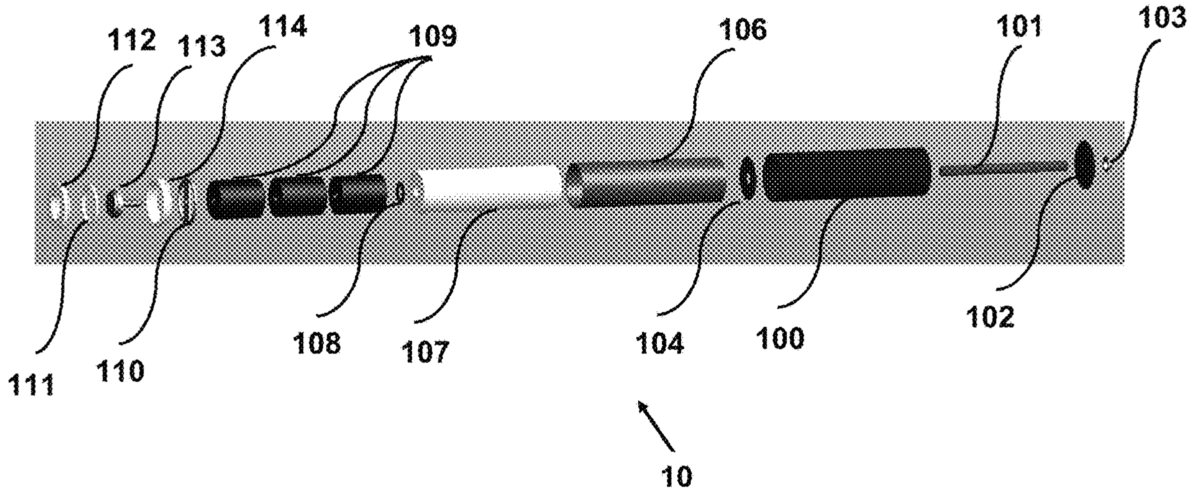
FIG. 19 shows an exploded perspective view of the parts of a battery in accordance with an embodiment of the present invention.

FIG. 19 shows an exploded view of the key features of a first embodiment battery (10) whilst FIGS. 1 to 17 show various stages in the formation of such a battery according to one embodiment. Referring firstly to FIG. 1, a first step in the formation of a battery is shown whereby a battery casing (100) is initially provided with opened first and second ends. The casing (100) is formed from an electrically-insulative material which is preferably a polymeric material. The casing (100) may preferably be formed by way of extrusion moulding or injection moulding techniques. Conveniently, extruded polymeric tubing is able to be formed relatively quickly and cost-effectively, and may be cut to size and dimensions suitable for use as the battery casing of AA and AAA standard size batteries.

A first end portion of the battery is provided comprising of a first end cap (102) with an aperture disposed in its center. A first end of a carbon rod (101) extends partially through the aperture in the first end cap (102) and a nickel-plated brass terminal (103) is attached to the first end of the carbon rod (101). The carbon rod (101) and the nickel-plated brass terminal (103) are co-moulded together with the first end cap (102) which in this embodiment includes any electrically-insulative polymeric material.

The first end cap (102) is shaped and dimensioned to complement the opening at a first end portion of the casing (100). During assembly of the battery, the first end cap (102) is moved into contact with the first end portion of the casing (100) such that the peripheral edge of the first end cap (102) neatly covers the opening of the first end portion of the casing (100). The first end cap (102) is then bonded to the first end portion of the casing (100) using any suitable bonding means which may include for instance, adhesive bonding or ultrasonic bonding. When bonded together, the first end cap (102) forms a water-tight seal around the opening at the first end portion of the casing (100) and the carbon rod is disposed inwardly of the casing chamber (100A) substantially along a length of the casing (100).

Figure 2:
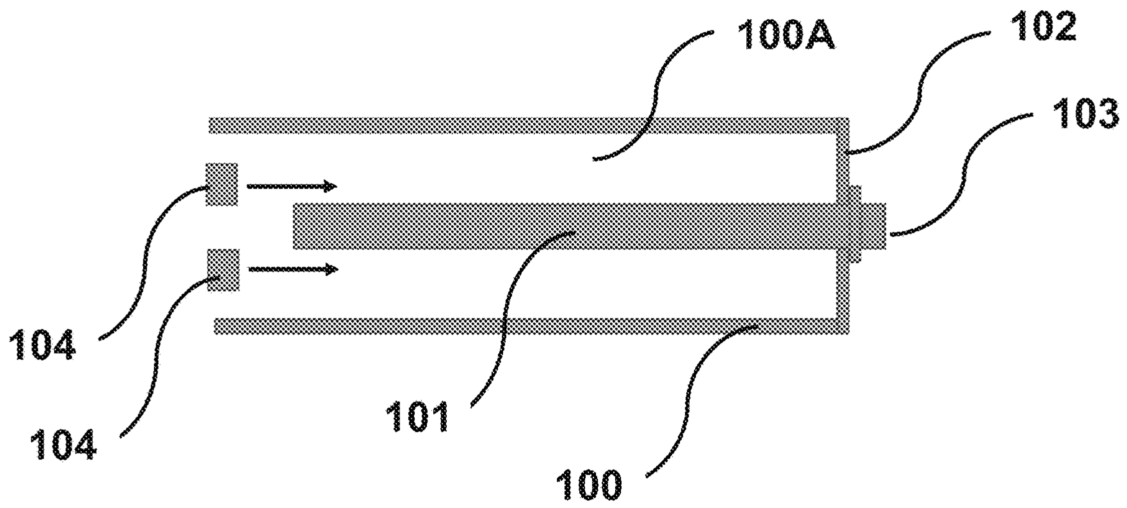
FIG. 2 depicts a side-cut away view of a second step in the production of batteries in which a biasing element is shown being positioned in the casing in accordance with an embodiment of the present invention.

Referring now to FIG. 2, a biasing member (104) is positioned inside of the casing chamber (100A), the purpose of which will be described further below. The biasing member (104) in this embodiment includes a circular-shaped silicone pad having an aperture disposed in its centre that is suitably shaped to allow it to be slid over the carbon rod (101) via an opening in a second end portion of the casing (100). The silicone pad is slid inwardly of the casing chamber (100A) along the carbon rod (101) until it abuts against an inward facing surface of the first end cap (102) of the first end portion. In alternative embodiments, the biasing member (104) may take the form of a coil spring or leaf spring configuration for instance.

Figure 3:
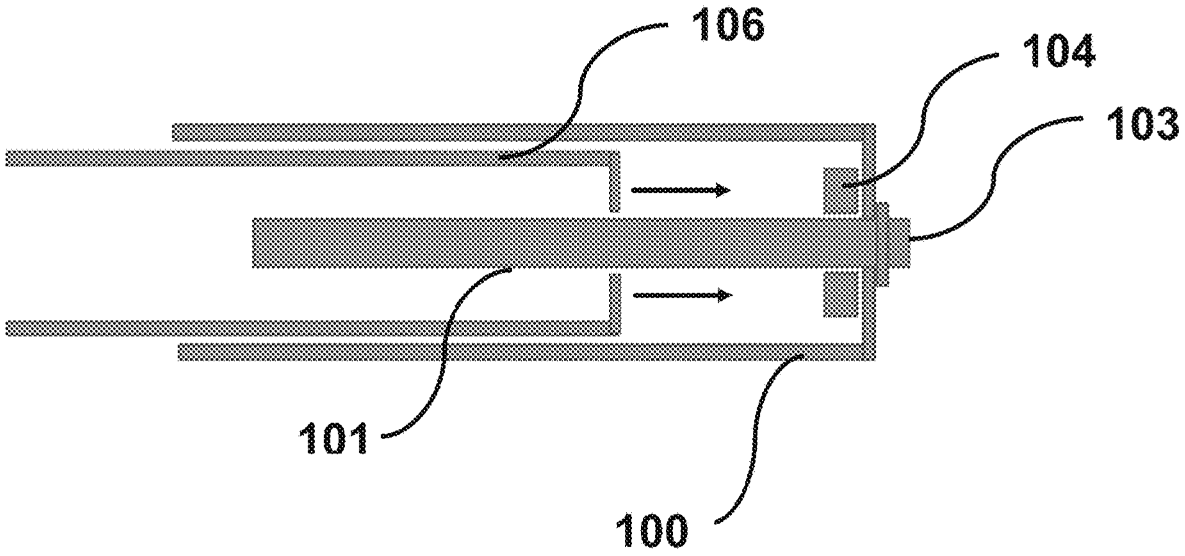
FIG. 3 depicts a side-cut away view of a third step in the production of batteries whereby a zinc tube is inserted into the casing in accordance with an embodiment of the present invention.
Figure 4:
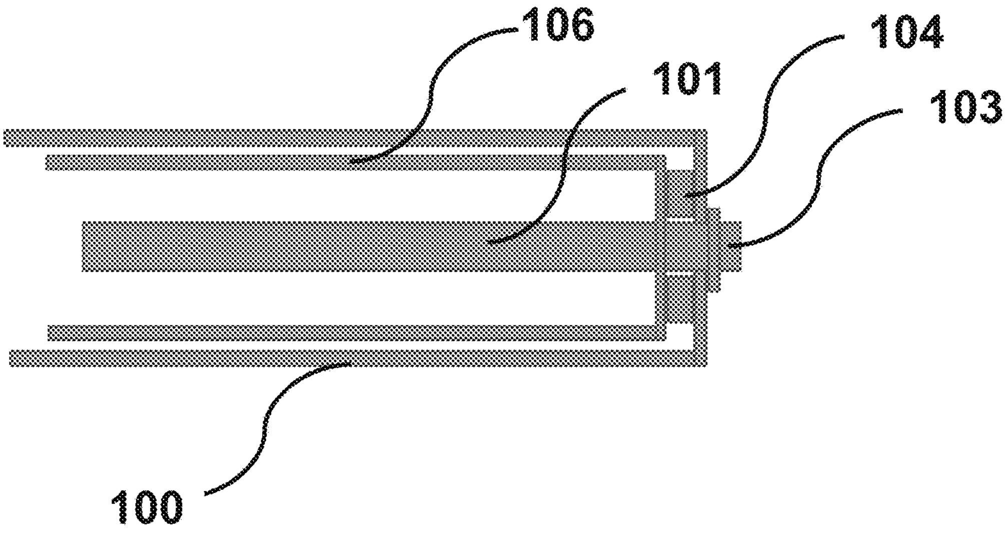
FIG. 4 shows a side cut-away view of a zinc lining resting against the biasing member after being inserted in to the casing.

As shown in FIG. 3, a conductive lining (106) is inserted into the casing chamber (100A) via the opening in the second end portion of the casing (100). The conductive lining (106) may comprise a conductive metal sheet that is rolled in to a tubular configuration. It may also include elongate slots of around 1.5-2.0 mm in width. The conductive lining (106) may be treated in an Indium bath solution at 105 degrees Celsius for 1-2 minutes. Alternately, Indium particles may be added into the electrolyte powder of the battery. In this embodiment, the conductive lining (106) includes a zinc material however other conductive materials may be used in alternate embodiments. The conductive lining (106) in this embodiment includes a cylindrical section having a first end with an opening of relatively smaller diameter that is sized and dimensioned to allow the carbon rod (100) to be snugly inserted therethrough and a second end with an opening of relatively larger diameter. The conductive lining (106) is slid into the casing chamber (100A) as shown in FIG. 3 until the conductive lining (106) abuts against the silicone pad (104) as shown in FIG. 4. The presence of the silicone pad (104) between the conductive lining (106) assists in biasing the conductive lining (106) in a direction towards the securement member (110) and battery terminal (113) so as to assist in maintaining electrical communication with the securement member (110) and battery terminal (113).

Figure 5:
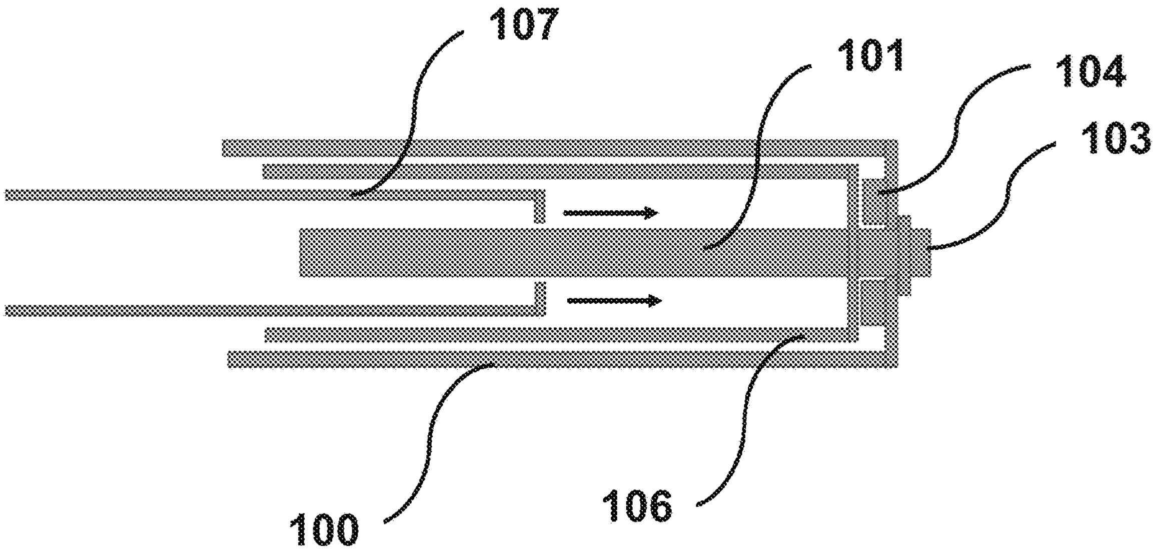
FIG. 5 shows a side cut-away view of a permeable separator sheet being inserted into the battery casing zinc lining resting against the biasing member after being inserted in to the casing.
Figure 6:
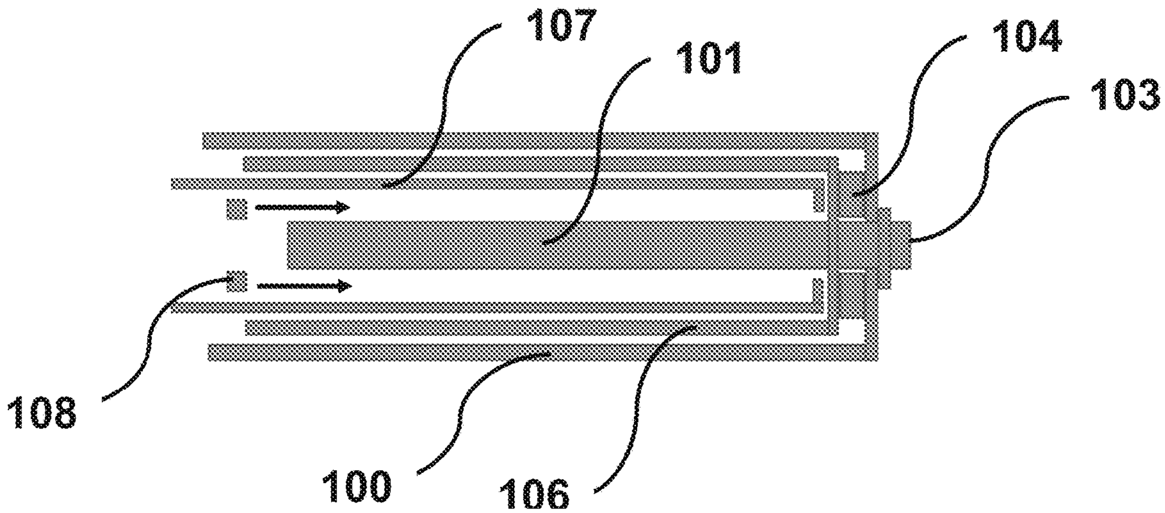
FIG. 6 shows a side cut-away view of a spacer element being inserted in to a nested position within the electrolyte paper.
Figure 7:
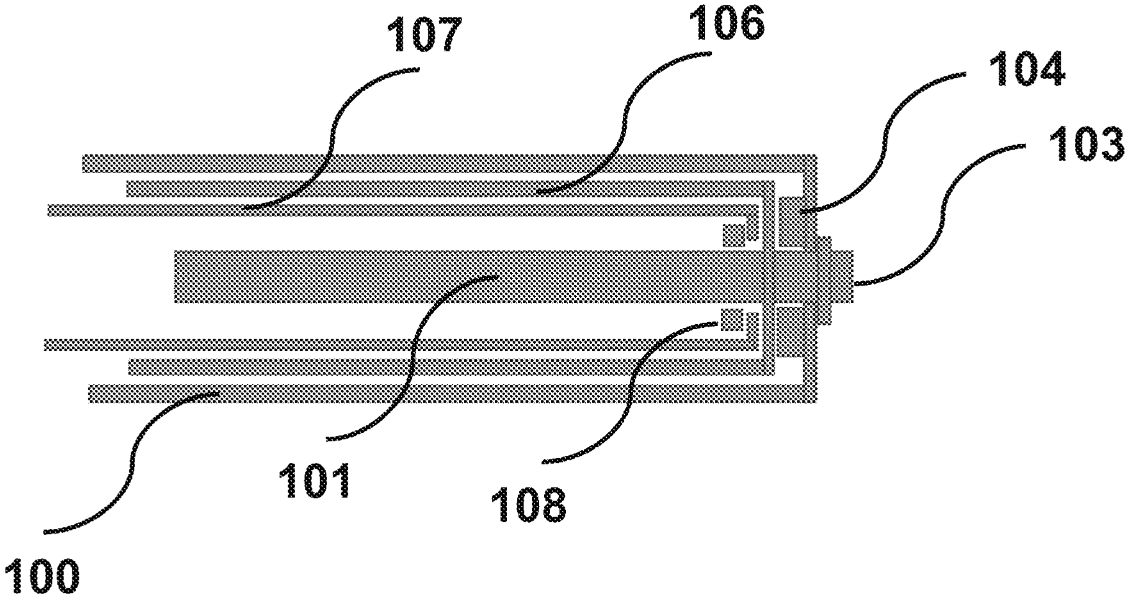
FIG. 7 shows a side cut-away view of a further step in production of a battery in accordance with an embodiment of the present invention.
Figure 8:
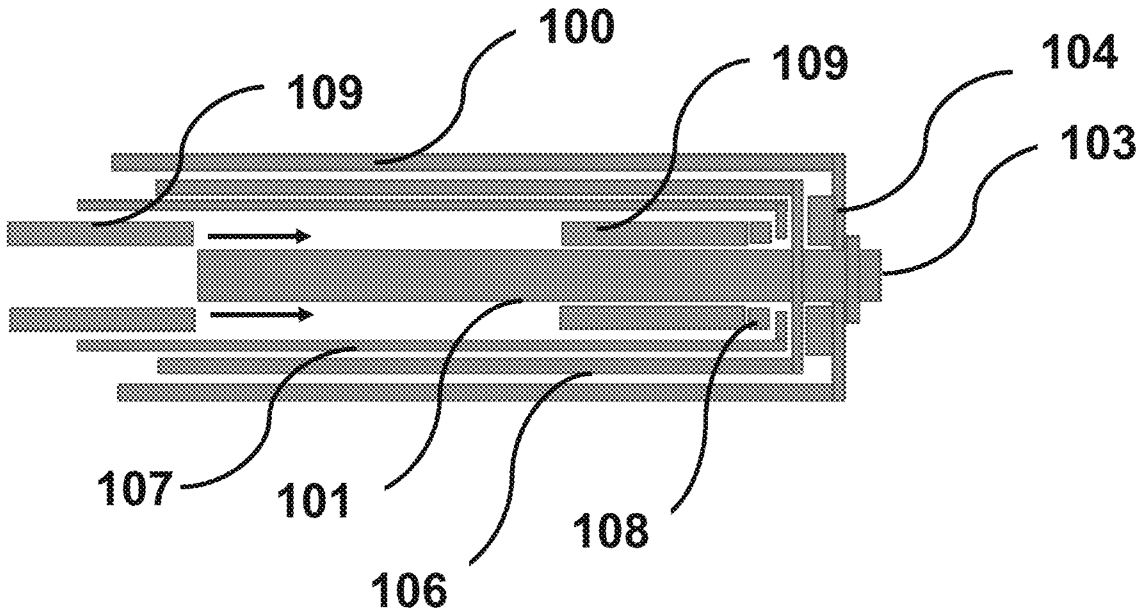
FIG. 8 shows a side cut-away view of electrolyte powder rings being inserted in to nested configuration within the permeable separator sheet in accordance with an embodiment of the present invention.
Figure 9:
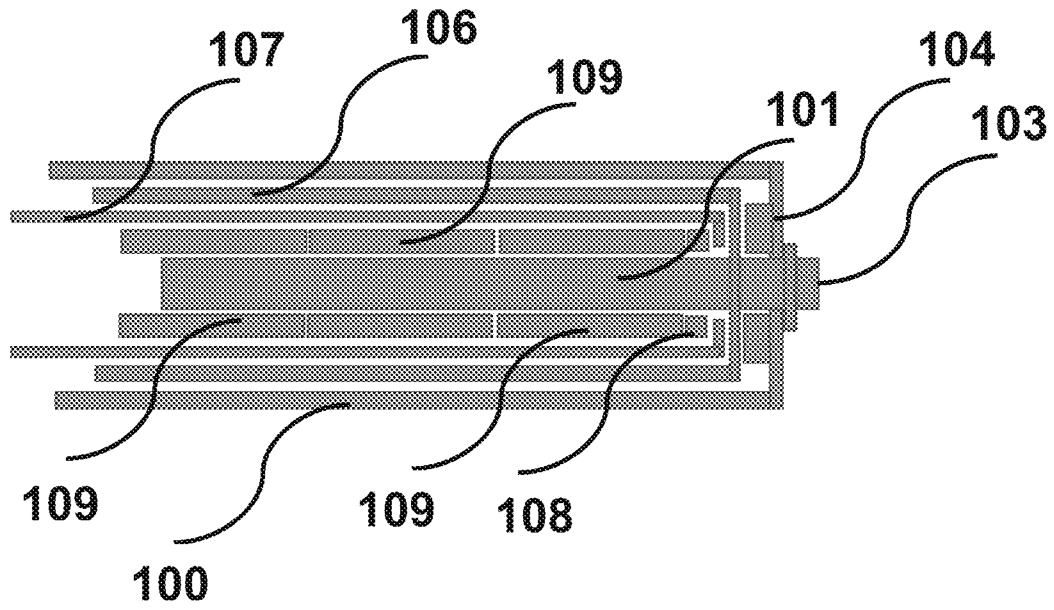
FIG. 9 shows a side cut-away view of all electrolyte power rings safely positioned within the casing before the permeable separator sheet not yet folded over to retain the electrolyte therein, in accordance with an embodiment of the present invention.

The battery also includes a permeable separator sheet (107) which is configured to be nested within the conductive lining (106). In this embodiment, the permeable separator sheet (107) is of similar shape configuration to that of the conductive lining (106) and also includes a first end with an opening of relatively smaller diameter that is sized and dimensioned to allow the carbon rod (100) to be snugly inserted therethrough and a second end with an opening of relatively larger diameter. The permeable separator sheet (107) is rolled in to a cylindrical configuration and slid into the casing chamber (100A) as shown in FIG. 5 until a surface of the permeable separator sheet (107) at the first end of the permeable separator sheet (107) abuts against the inner wall of the conductive lining (106) as shown in FIG. 6. Once the permeable separator sheet is in place, a spacer element (108) is positioned in the casing chamber (100A) so as to be surrounded by the permeable separator sheet (107) as shown in FIG. 6. The spacer element (108) in this embodiment is a disk-shaped element having an aperture disposed centrally of it which is sized and dimensioned for the carbon rod (101) to fit snugly therethrough. The spacer element (108) is slid along the carbon rod (101) until it abuts against the inward facing surface of the permeable separator sheet (107) as shown in FIG. 7. In this embodiment the spacer element (108) is comprised of a silicone material although it need not necessarily be silicone and may be comprised of a non-polymeric material as long as it is suitable for spacing apart the electrolyte powder rings from the surface of the conductive lining (106) as depicted in the drawings.

Figure 17:
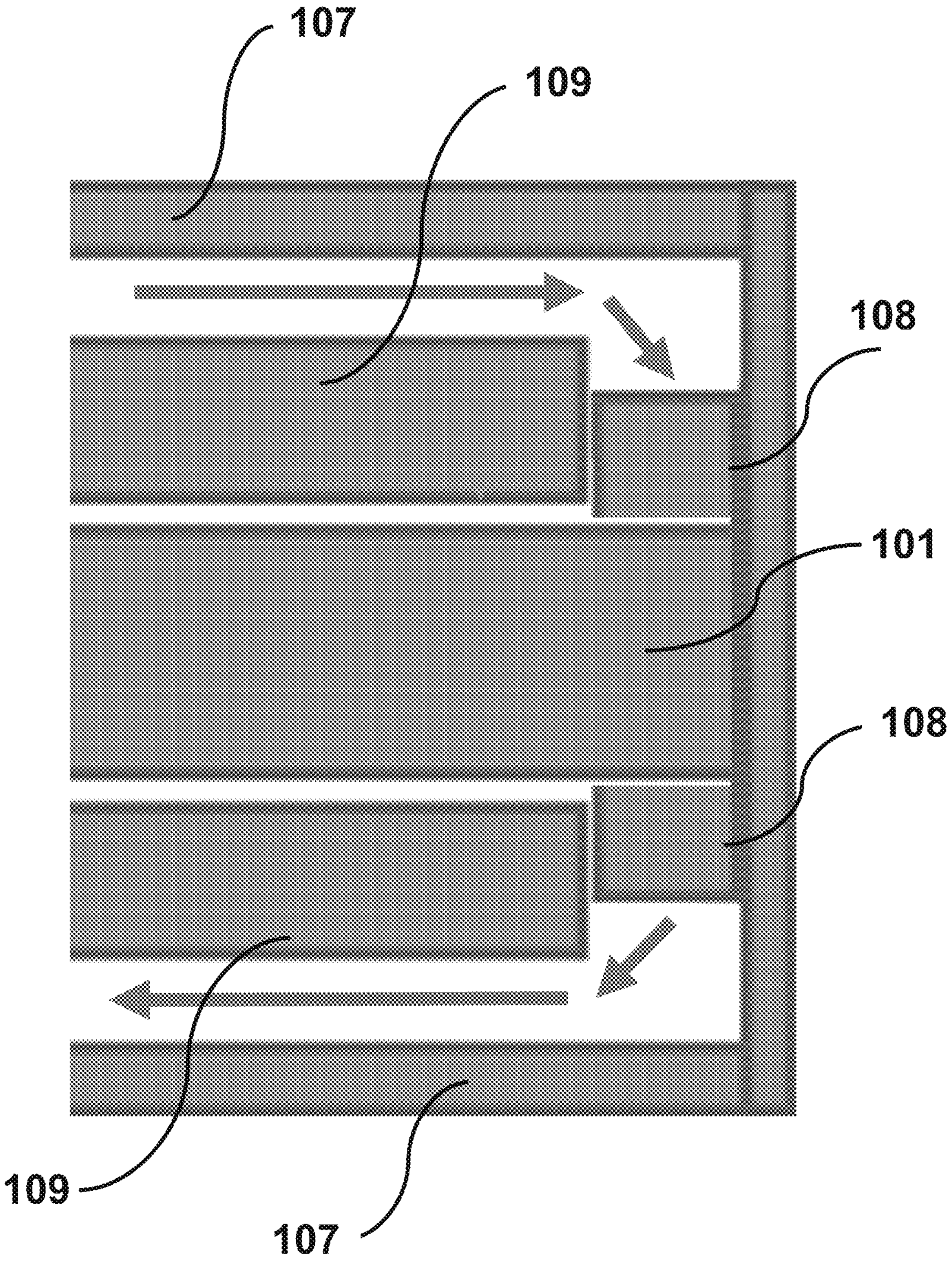
FIG. 17 illustrates how water is vented within the battery casing by virtue of the spacer element in accordance with an embodiment of the present invention.
Figure 18:
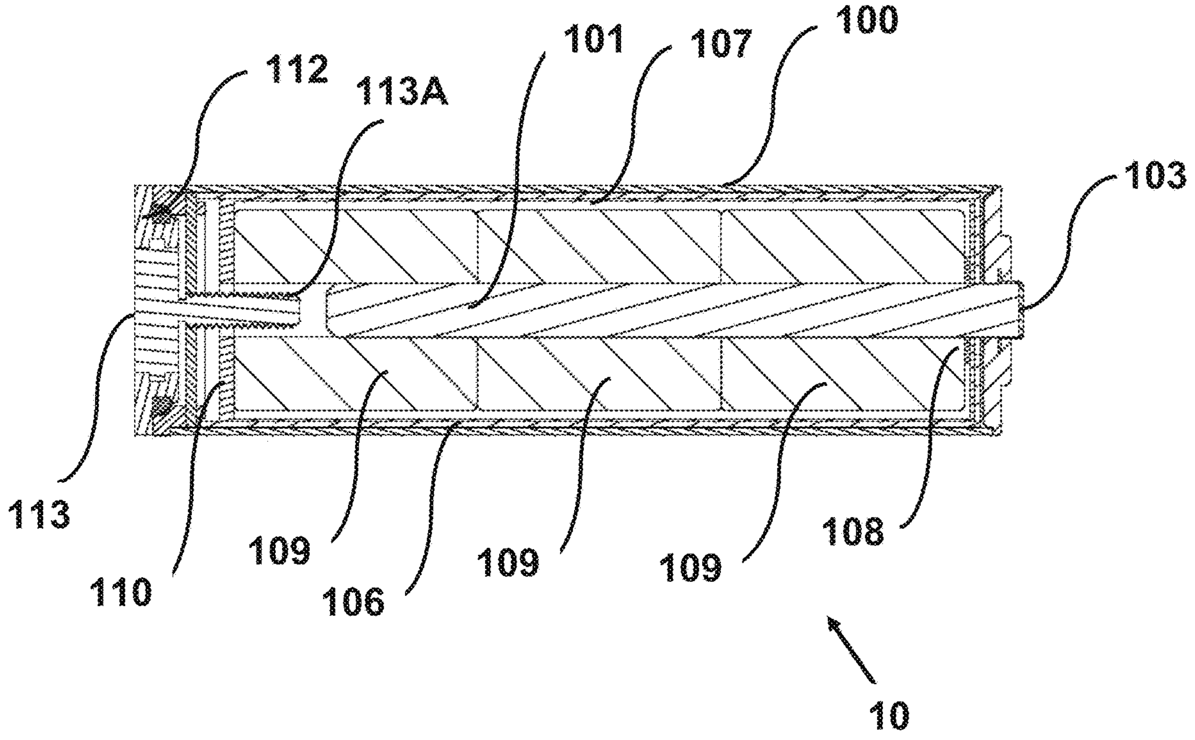
FIG. 18 illustrates a further exemplary depiction of a battery embodiment of the present invention.

The battery (10) includes three compressed electrolyte powder rings (109) which are slid into the casing chamber (100A) so as to be surrounded by the permeable separator sheet (107). The diameters of the compressed electrolyte power rings (109) are formed so as to allow for a suitable gap between the peripheral edges of the powder rings (109) and the permeable separator sheet (107) whereby when the compressed electrolyte powder rings (109) are exposed to water, the expansion of the powder rings (109) may be conveniently accommodated by inclusion of the gap. Also the silicone spacer element (108) disposed between the first compressed electrolyte power ring and the permeable separator sheet (107) assist in allowing the venting of water which may circulate more freely within the casing chamber (100A) and thereby assist in enhancing battery performance. FIG. 17 shows a magnified cut-away view of the spacer element (108) nested within the conductive zinc lining (106) whereby it spaces the compressed electrolyte powder rings from the zinc lining and water is able to be vented within the casing chamber (100A) along a flow path as represented by the direction of the arrows.

The electrolyte comprising the compressed powder rings (109) may be formed from a metal oxide powder such as manganese dioxide, iron oxide or crystalline silver oxide. In this embodiment, the electrolyte includes approximately 3% ammonium chloride particles, 16% zinc chloride particles, 68% manganese dioxide particles, 12.4% acetylene carbon black particles and 0.6% zinc oxide particles by percentage weight of the electrolyte. Before being compressed into powder rings, the electrolyte particles are ball-milled using a rotary or planetary ball mill and ceramic balls such as agate (carnelian). During testing, a laboratory ball-milling machine of 500 ml volume was used with ceramic milling balls weighing 110*g* and having diameters of 22.4 mm, or, small sized balls weighing 190 g weight and having diameters of 10.0 mm. Also during testing, 150 g of electrolyte was milled on each occasion. It would be understood that the ball milling of the electrolyte can be suitably scaled up to industrial size to accommodate much larger production. Electrolyte particles resulting from the ball-milling have substantially spherical-shaped configurations with diameters approximately in the range of around 0.2-0.8 mm, densities in the range of approximately 1.71-1.75 g/cm3, and water content of approximately 3% or less. Embodiments of the present invention are assembled in a humidity controlled environment, commonly referred to as a "dry room" to alleviate risk of moisture inadvertently activating the electrolyte.

Figure 10:
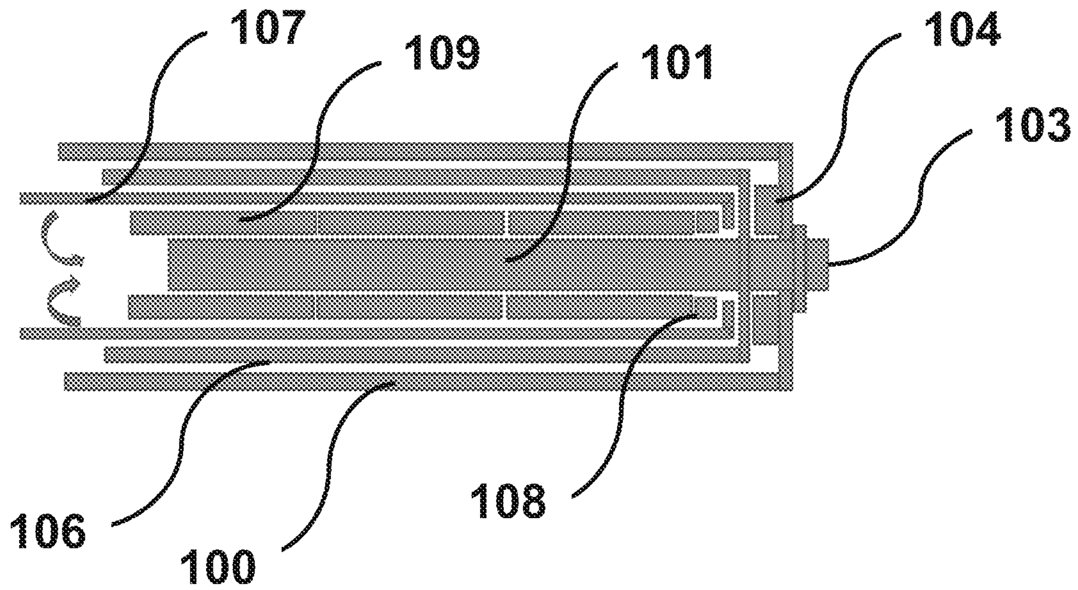
FIG. 10 shows a side cut-away view of all electrolyte power rings safely positioned within the casing just as the permeable separator sheet is beginning to be folded over to retain the electrolyte therein in accordance with an embodiment.
Figure 11:
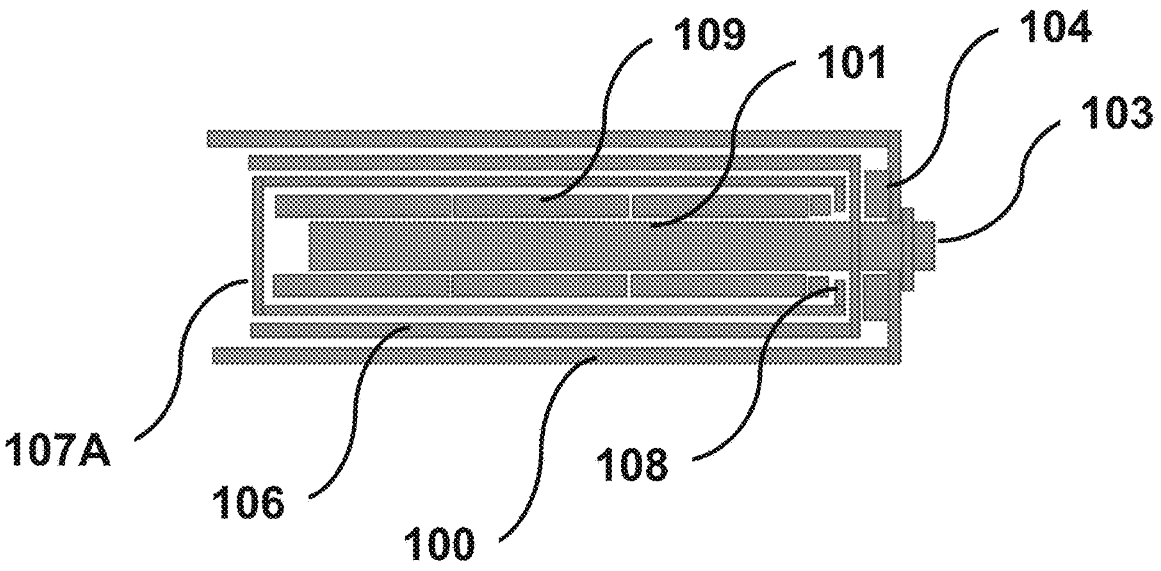
FIG. 11 shows a side cut-away view of a battery with the permeable separator sheet folded over the electrolyte power rings to retain the electrolyte therein, in accordance with an embodiment.
Figure 12:
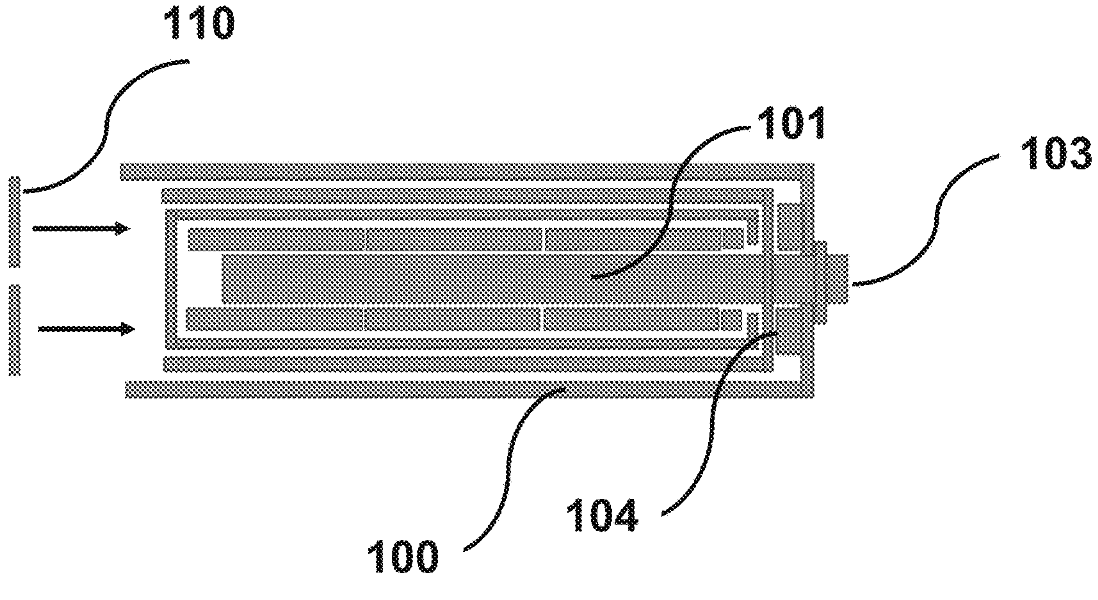
FIG. 12 shows a side cut-away view of a securement member in the process of being moved in to the battery casing so as to hold the separator sheet folded over in accordance with one embodiment of the present invention.
Figure 13:
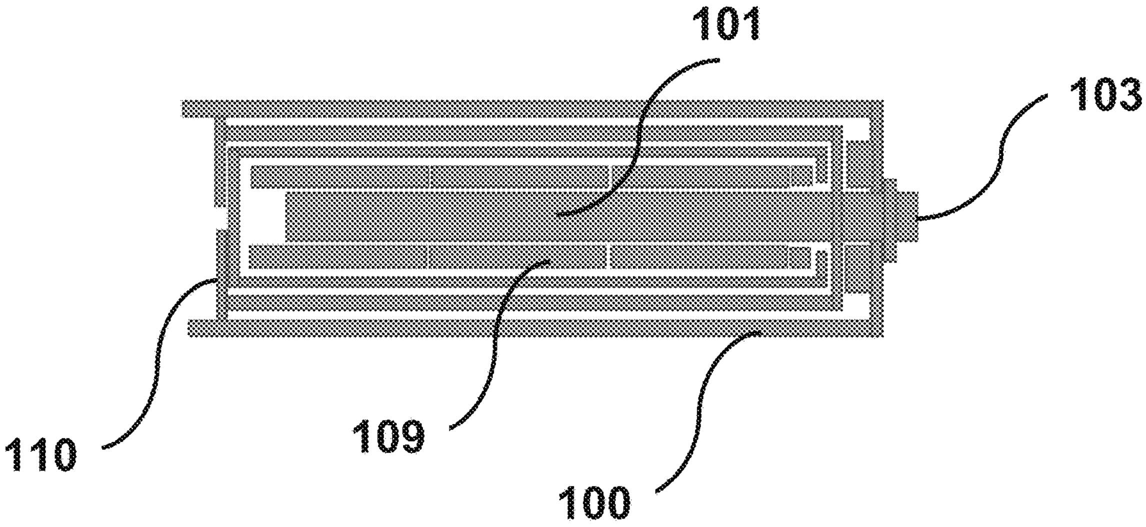
FIG. 13 shows a side cut-away view of a securement member firmly in place within the battery casing in accordance with an embodiment of the present invention.
Figure 14:
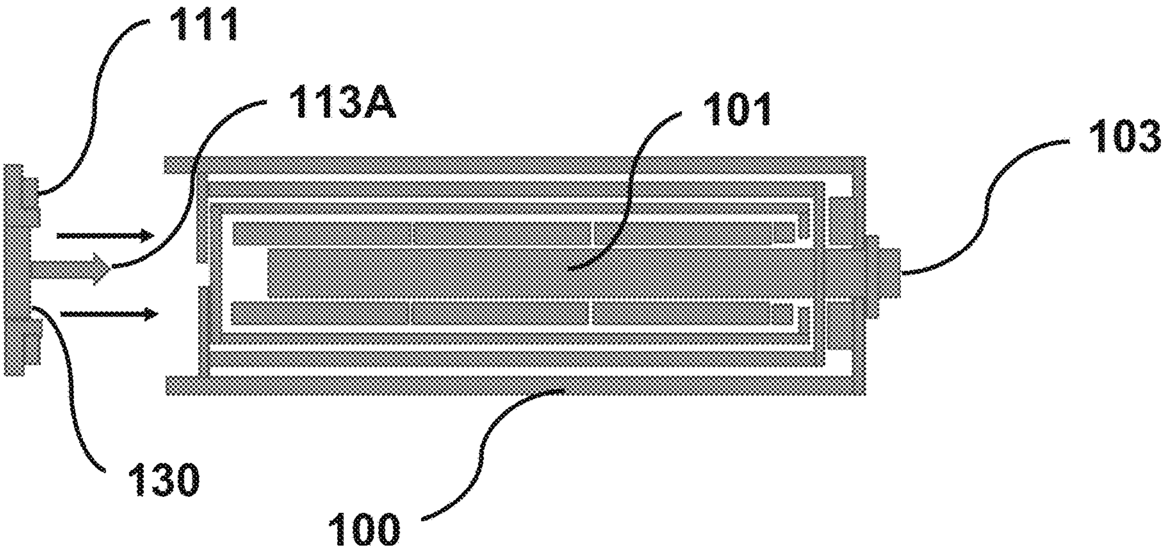
FIG. 14 shows a side cut-away view of all electrolyte power rings safely positioned within the casing, the permeable separator folded over to retain the electrolyte therein, and a second end cap being positioned for attachment to the battery casing.
Figure 15:
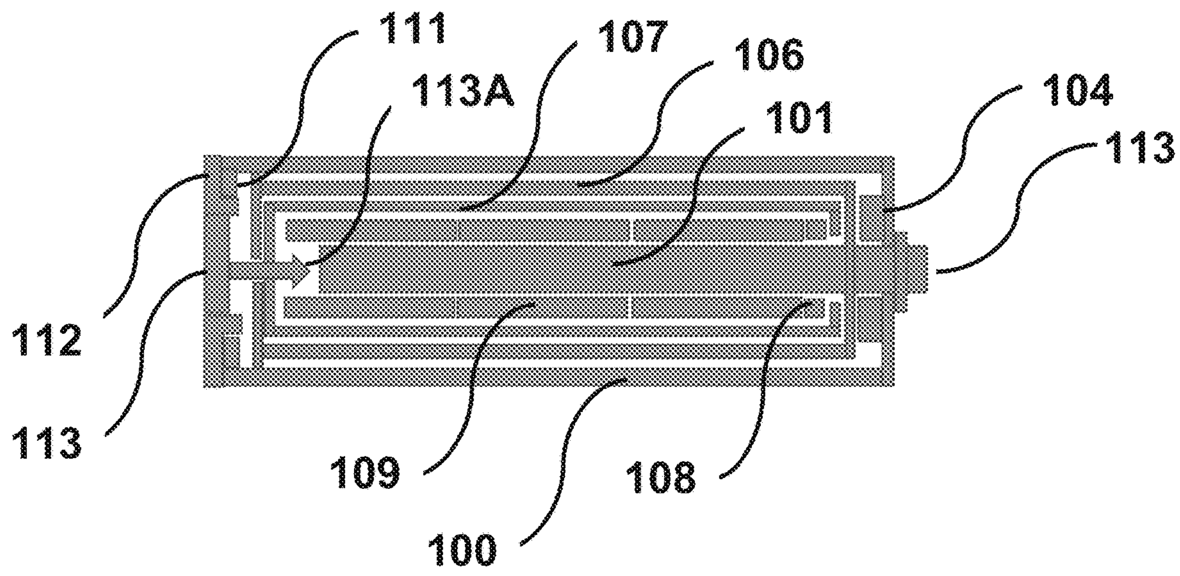
FIG. 15 shows a side cut-away view of a battery and the second end cap arranged in a closed position in relation to the opening in the casing, in accordance with an embodiment.
Figure 16:
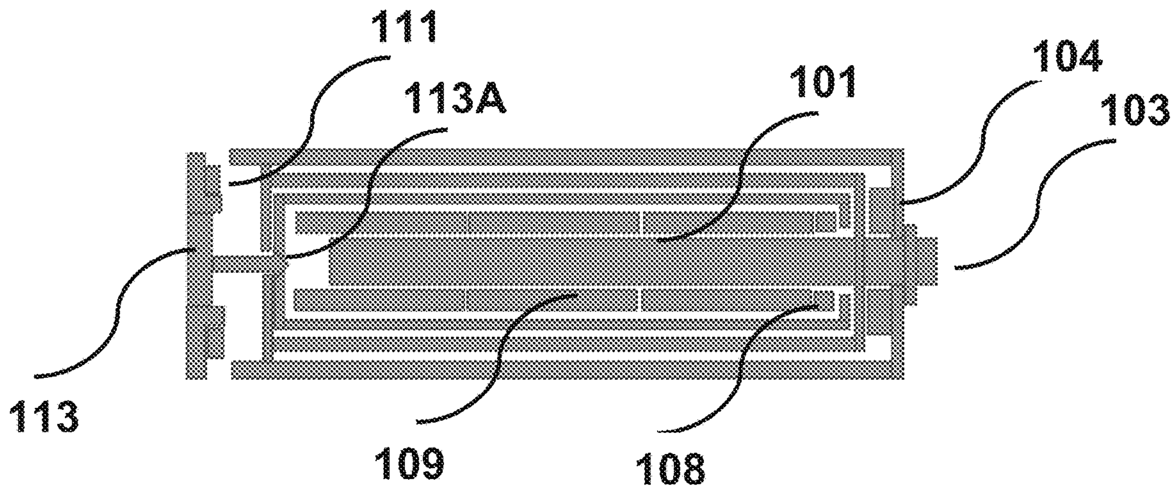
FIG. 16 shows a side cut-away view of a battery and the second end cap arranged in an opened position in relation to the opening in the casing. The second end cap cannot be entirely detached by virtue of the shape configuration of the conductive pin (113A) which is engaged within the aperture of the securement portion (110)

Once the compressed powder rings (109) are nested within the casing chamber (100A), the permeable separator sheet (107) is folded inwardly over the electrolyte (109) as shown in FIG. 10. As shown in FIGS. 12 and 13, a securement member (110) is configured for positioning within the casing (100) so as to secure the end of the permeable separator sheet (107) in its folder over position. The securement member (110) is co-moulded with one portion of a polymeric annular ring (114) that is bonded to the casing (100) adjacent the opening at the second end portion of the casing (100). Another portion of the polymeric annular ring (114) may include screw-threads which are configured for screw-threaded engagement with a corresponding threaded polymeric disk member (112). The threaded polymeric disk member (112) can be screwed into and out of engagement with the polymeric annular ring (114) so as to selectably seal and unseal the opening disposed in the second end portion of the casing (100) and serves as a second end cap (112). A metal conductive terminal (113) is disposed centrally of the threaded polymeric disk member (112) and has a conductive terminal pin (113A) extending from it inwardly of the casing chamber (100A) through the polymeric annular ring and through an aperture disposed in the securement member (110). In this embodiment, the tip of the conductive terminal pin (113A) is suitably shaped to allow it to be inserted through the aperture of the securement member (110) but to thereafter also be restricted from being retracted in a reverse direction out of the aperture of the securement member (110). In this way, a screw valve type assembly is conveniently formed at the second end portion of the casing (100) to selectably unseal the opening for ingress of water into the casing chamber (100A) or to selectably seal the opening to prevent the water from leaking out of the casing chamber (100A). As there are no detachable parts of the sealing arrangement in this embodiment as compared to embodiments where an entirely detachable end cap may be employed to seal or unseal the end of the casing (100), this alleviates risk of the end cap from being inadvertently misplaced. Of course, it is possible in certain embodiments for the sealing arrangement to include an entirely detachable second end cap (112) if so required. Further, any type of valve mechanism may be disposed on the second end portion of the casing (100) which may differ to the aforementioned valve mechanism, Further, instead of the second end cap (112) being configured for screw-threaded engagement with the second end portion of the casing (100), it may be connected by a bayonet type fitting mechanism or any other suitable mechanism.

As the metal conductive terminal (113) and the securement member (110) are both formed from conductive materials, they are both simultaneously in electrical communication with the conductive zinc lining (106) due to the biasing member (104) urging the conductive lining (106) against the securement member (110).

In this embodiment, the steps in which the second end cap (112) is connected to the second end portion of the casing (100) are as follows. The electrically-insulative polymeric annular ring (114) is first co-moulded with the conductive securement member (110) before the polymeric annular ring (114) is bonded to the casing, for instance using ultrasonic bonding. The corresponding threaded polymeric disk member (112) is co-moulded with an o-ring (111) and the conductive terminal/conductive pin (113/113A). The pin head (113A) of the conductive terminal pin is inserted into the aperture of the securement member (110) and either the shape of the pin head itself will prevent its withdrawal from the aperture, or, the pin head may be further manipulated after insertion (e.g. by TIG welding the tip of the pin, or bending the tip of the pin) to prevent its withdrawal from the aperture. The polymeric annular ring (114) may then be ultrasonically or adhesively bonded to the casing such that the entire second end cap (112) assembly is secured to the second end portion of the casing (100) in a screw-valve arrangement which may be used to selectably seal and unseal the end of the casing. When unsealed, an opening in the second end portion of the casing (100) is exposed to allow ingress of water in to the casing chamber (100A).

Embodiments of the battery (10) once assembled remain in an inactive state—that is, the electrolyte within the casing is not as yet suitable for operation of the battery in powering a load attached to the battery terminals. Upon ingress of water into the casing (100) via the unsealed second end of the casing the water flows along and through the permeable separator sheet (107) and into contact with the electrolyte powder rings (109). Once water has suitably contacted with the electrolyte (109) in the casing (100) it becomes suitable for effecting ion flow whereby a potential difference is generated between the conductive terminals (103,113) for powering a load device connected thereto.

Advantageously, due to battery embodiments of the present invention being kept in an inactive state until use, such battery embodiments enjoy a shelf-life of considerably longer duration than conventional off-the-shelf type batteries intended for similar use. In contrast, conventional type batteries tend to deteriorate in performance much faster when in storage due to the electrolyte powder mixture being activated at the point of manufacture. Whilst embodiments of the present invention described herein are particularly well-suited for and intended for use during emergency situations due to the longer shelf-life, the actual output performance of such battery embodiments may be comparable or superior to the power output expected of certain conventional batteries.

Also advantageously, the spacer element assists in providing venting of water within the battery casing and the resulting water circulation may improve battery performance by increased speed of exposure of the electrolyte to water within the casing.

Yet a further advantage of embodiments of the present invention may involve use of the biasing member (104) such as silicone pad which urges the conductive lining (106) in a direction which assists in it maintaining either direct or indirect electrical communication with the battery terminal pin (113A) and securement member (110).

Yet a further advantage of embodiments of the present invention is that end portions of the casing (100) may be quickly and easily secured by ultrasonic welding which alleviates the unsightly nature of adhesive bonding as well as the uneven sealing associated with adhesive bonding.

Yet a further advantage associated with the embodiments of the present invention is that as the wall thickness of the casing (100) may be made relatively thinner by using extruded polymeric material, this also allows for an increase in the amount of compressed powder that may be received within the casing (100) and this improves overall battery output performance. Furthermore, by utilising extruded polymeric material as the battery casing (100), a relatively thicker walled conductive lining (such as a zinc shell) may be relatively cheaply extruded and cut to size for use in the manufacture of batteries, and which may be easier and quicker to insert into the battery casing during manufacture of the batteries due to the thicker walled conductive lining (106) maintaining a straight configuration within the casing (100). In contrast with certain prior art approaches, a relatively thin and conductive lining may be used which tends to not keep a straight shape within the casing and thereby makes the manufacturing process of the prior art batteries more tedious.

Figure 20:
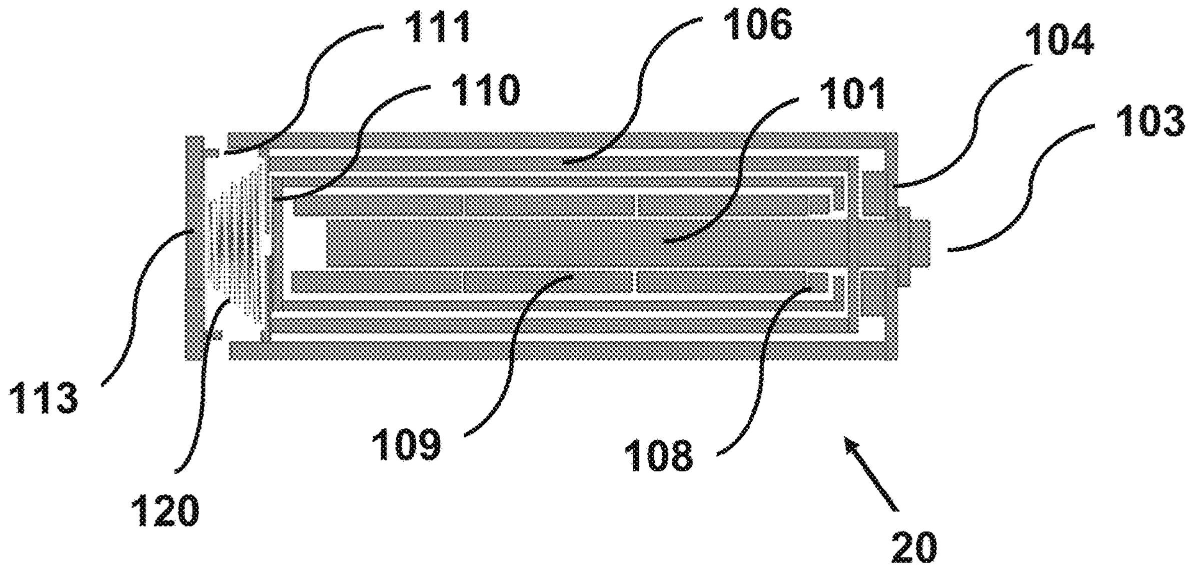
FIG. 20 shows a side cut-away view of another embodiment in which a tapered coil spring is used to electrically connect the battery terminal on the second end cap with the conductive lining in the casing chamber.

Referring now to FIG. 20, another embodiment (20) is shown which is a modified version of the aforementioned battery embodiments. In this embodiment, and in contrast to the aforementioned embodiments, a tapered metal coil spring (120) is utilised for providing electrical communication between the battery terminal (113) and the conductive lining (106). Specifically, the tapered end of the metal coil spring is coupled to the battery terminal (113) and the opposing "base" end of the coil spring (120) is couple to the securement member (110) which is in turn coupled to the conductive lining (106). The base end of the coil spring (120) is co-moulded in to the securement member (110) so that the coil spring (120) is able to be located securely within the casing chamber (100A) by positioning of the securement member within the casing chamber (100A).

Figure 21:
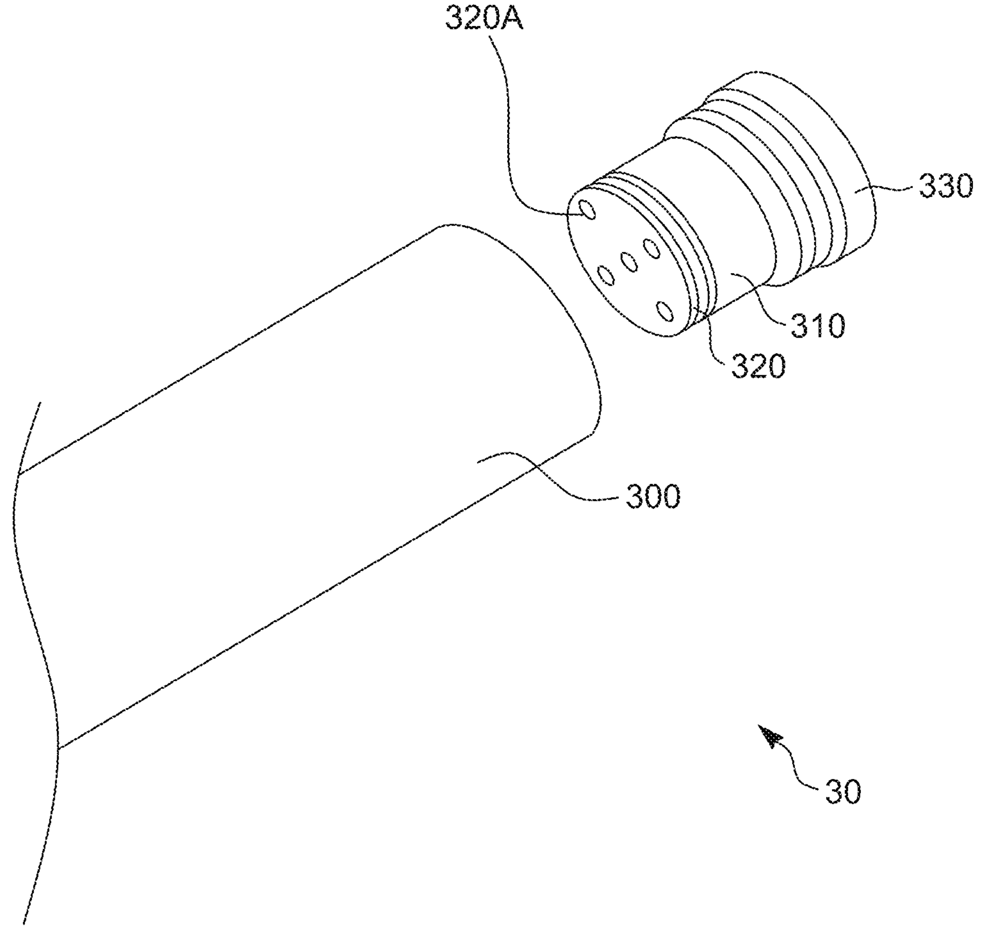
FIG. 21 shows a perspective view of yet another embodiment with second end cap disassembled from the casing, in which a compartment is configured for location at one end of the battery for releasably storing one constituent (e.g. water, KOH solution etc) that is able to be controllably released by the user from the compartment for interaction with another constituent within the casing chamber so as to provide an electrolyte within the chamber that is suitable for operation of the battery in powering a load.
Figure 22:
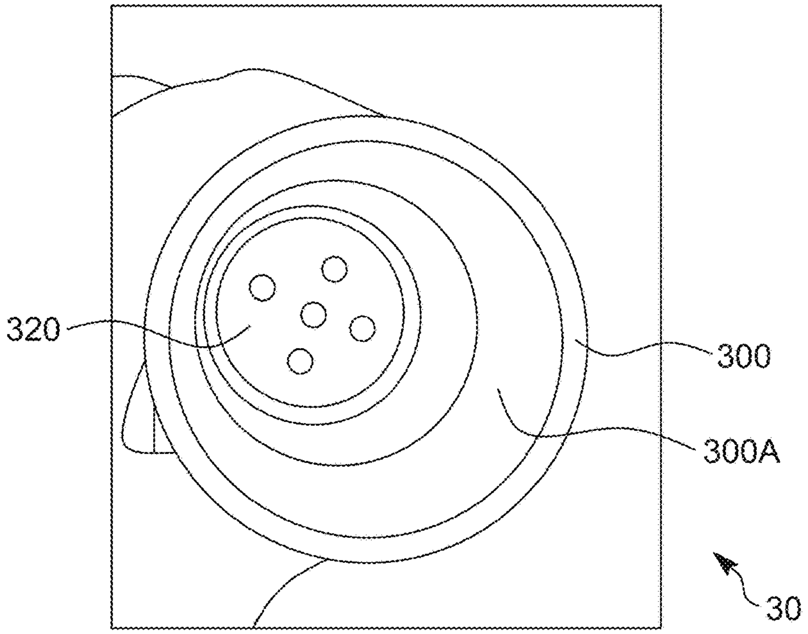
FIG. 22 shows a view of the embodiment of FIG. 21 along the casing of the battery from the first end portion of the casing prior to ultrasonic welding of the first end cap thereon, prior to electrolyte constituent being inserted in to the casing chamber, and prior to the second end cap being ultrasonically welded to the second end portion of the casing.
Figure 23:
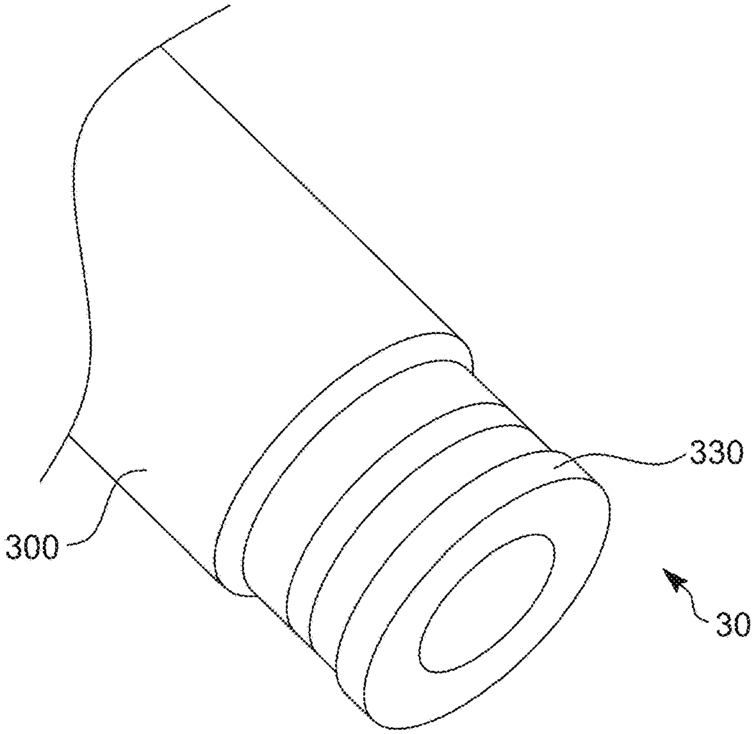
FIG. 23 shows a view of the embodiment of FIG. 21 in which the second end cap is in the process of being assembled to the second end portion of the battery casing.

In certain embodiments such as shown in FIGS. 21 to 23, and in contrast to the aforementioned embodiments, the casing (300) may not include a releasably sealable second end cap, and instead, may be manufactured as a sealed vessel is not ordinarily configured for being opened during use (i.e. by removal of the second end cap or otherwise). In this alternate embodiment, a supply of water is stored internally of a water-tight compartment (310) within the chamber (300A) such that it is not necessary for the casing (300) to be opened so that an external supply of water can be introduced in to the casing chamber (300A) for interaction with the electrolyte powder (not shown). Whilst the water remains in the water-tight compartment (310) separated from the electrolyte powder in the sealed casing chamber (300A), the electrolyte is "inactive"—that is, the electrolyte is not suitably configured for operation of the battery (30) to power a load. When a particular type of force is applied to an outer-region of the casing (300), the water-tight compartment (310) is configured for adjustment whereby the water stored in the compartment (310) is released into contact with the compressed electrolyte powder so that the electrolyte in the chamber (300A) is suitable for operation of the battery (30) to power a load attached to the battery (30). By way of example, the nature of the force applied to the outer region of the casing (300) may include rotating a first portion (330) of the battery, which by way of example comprises an end cap (330) of the battery (30) relative to the casing (300). Alternatively, the force applied may include for instance:

(a) sliding a first portion of battery casing relative to a second portion of the battery casing;
(b squeezing a portion of the battery casing;
(c) deforming a portion of the battery casing;
(d) depressing a portion of the battery casing;
(e) shaking the battery casing;
(f) pulling a first portion of the battery casing away from a second portion of the battery casing; or
(g) hitting the battery casing with another object.

The compartment may be located within the casing chamber (100A) adjacent to the second end portion of the casing. A wall (320) of the compartment separates the compartment from the compressed electrolyte powder in the chamber (100A). The wall (320) may for instance comprise a first and second rigid planar disc each having holes disposed in them of roughly similar size and dimensions, such as a hole 320A. Planar surface of the discs lie flush against each other and may be configured for rotational or slidable movement relative to each other between at least a first configuration in which the holes in the first and second discs are non-aligned so as to restrict evacuation of water from the compartment (310) into contact with the electrolyte powder within the chamber (300A), and, a second configuration in which the holes in the respective first and second discs align with each other such that the water in the compartment (310) is able to be evacuated from the compartment (310) via the aligned holes in to contact with the electrolyte powder in the chamber (300A). In this embodiment the end portion (330) of the battery (30) is operably coupled with the second disc such that the second disc is caused to rotate together with the rotating end portion between different configurations relative to the first disc so as to allow the water within the compartment (310) to be released in to the chamber (300A) with the compressed electrolyte powder. It should be noted that in this embodiment, the compartment (310) need not necessarily store water. Instead, any two constituents may be separated within the chamber (300A) and configured for user-controlled interaction together to provide an electrolyte composition in the chamber (300A) that is suitable for operation of the battery (30) in order to power a load attached to the battery terminals. For instance, a compressed metal oxide powder may be disposed in the chamber (300A) whilst a potassium hydroxide solution, a zinc chloride solution or water may be initially separately stored in the compartment (310) in readiness for release by the user. Yet further in certain embodiments, the compartment (310) may take the form of a sealed envelope that may be rupturable by piercing or tearing when force is applied to an outer region of the casing (300). It would be appreciated that embodiments such as these utilising a casing comprising a sealed vessel, various advantages are provided particularly when such batteries are used in an emergency situation such as a natural disaster. Firstly, it is not necessary for the user to find an external water supply to fill the battery with to activate the compressed electrolyte powder for operation of the battery. Secondly, the user is not required to unseal the battery casing at all to fill the casing chamber (300A) with water. The elimination of any one of these two steps may save crucial moments in an emergency situation such as when activating a signaling flare on a life-raft to attract the attention of rescuers. This also obviates risk of a user fumbling with the battery trying to fill the battery with an external supply of water during a high-stress situation. Instead, the user need only rotate the portion (330) of the battery relative to the casing (300) to release the water in the compartment (310) in to contact with the compressed electrolyte powder within the battery chamber (300A).

In any one of the above embodiments, a portion of the electrolyte powder mixture may include at least some disintegrant type particles. The disintegrant type particles that are adapted to enhance absorption of water into the electrolyte powder mixture by way of capillary action and wicking as well as swelling upon contact with water. By way of example, the disintegrant may comprise suitably sized and dimensioned pellets uniformly dispersed within the electrolyte powder mixture that are able to absorb up to 200 times its weight in water, and in doing so, breaks up the electrolyte power as the disintegrant swells up and expands. In alternate embodiments, any other suitable disintegrant type particles may be utilised which may break apart the compressed electrolyte powder ring—for instance as a result of:

a) expansion caused by heating entrapped air;
b) disintegrating forces;
c) deformation of the compressed powder ring;
d) the release of gaseous materials; and/or
e) being triggered by enzymatic action;

The inclusion of disintegrant type particles in the compressed electrolyte powder provides several advantages—that is, (i) it increases porosity within the compressed electrolyte powder ring when the disintegrant type particles absorbs water and expands which allows for enhanced liquid penetration into the compressed electrolyte powder ring and faster activation of the electrolyte; (ii) the swelling and expansion of the disintegrant type particles forces the electrolyte powder against the separator paper which enhances electrical contact and improved amperage of the battery in use; (iii) the electrolyte powder may be subjected to harder compression to improve overall amperage of the battery in use as the presence of the disintegrant type particles in the electrolyte powder ensures that water is able to suitably penetrate in to the electrolyte powder; (iv) in embodiments in which an internal water supply is releasably-sealed within a compartment in the battery chamber separate from that of the electrolyte powder before activation, a relatively small amount of water need only be stored in the rupturable compartment due to the improved water absorption ability of the disintegrant type particles within the electrolyte powder; and (v) a single compressed powder ring may be formed for insertion into the casing chamber instead of multiple compressed powder rings due to the improved water absorption properties of the disintegrant type particles.

Figure 24:
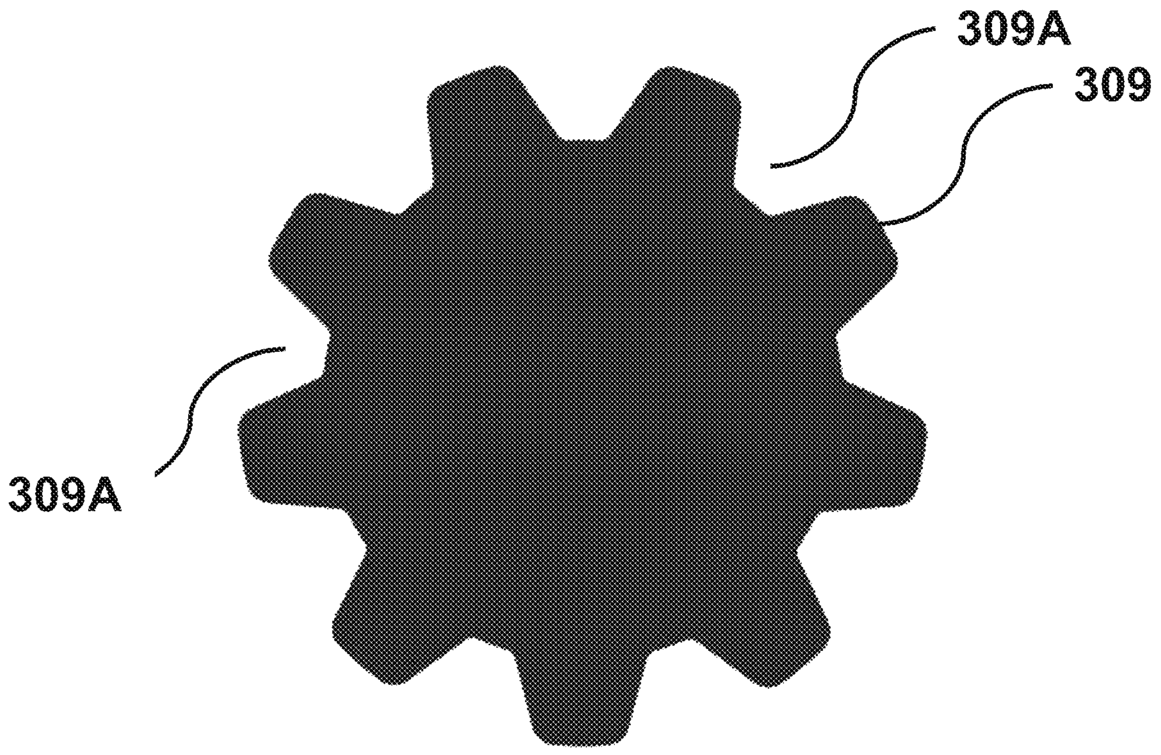
FIG. 24 shows a top-view of an exemplary compressed powder ring for insertion in to the casing chamber and having a flower or gear-shaped cross-sectional profile.

To further enhance water flow within the chamber (300A) a cross-sectional shape profile of the compressed electrolyte powder ring (309) may comprise a flower or circular gear type shape such as is shown in FIG. 24, which provides water flow channels (309A) along the length of the compressed powder ring.

In certain embodiments, at least one air outlet channel is provided in the casing to allow air within the battery casing to be expelled out from the battery casing. This alleviates excessive pressure build up within the casing chamber (300A) due to expansion of the disintegrant type particles of the electrolyte powder. The at least one air outlet channel is disposed in one of the end portions of the battery casing. Typically, two to three air outlet channels of around 0.3 mm may be disposed in the first and/or second end portions of the battery casing. Further, a membrane layer may be disposed on the inward-facing surface of the end caps to cover the air outlet channels. The membrane allows flow of air therethrough but prevents liquid from flowing out of the battery via the air outlet channels. Yet further, a sticker may also be disposed on an outward-facing surface of the first and/or second end portion in which the air outlet channel is disposed. The sticker prevents evacuation of air from the casing until the battery is activated and in use. In certain embodiments, the conductive lining may also include several elongate slots of around 1.5-2.0 m, in width cut-out of it to improve flow of air from within the chamber (300A) outwardly via the air outlet channels.

In certain embodiments any one of the aforementioned batteries may be integrally built into a range of different types of devices such as for instance, handheld and mobile electronic devices for the sending and receiving of telephone calls, faxes, electronic mail, and digital data messages; handheld and mobile computers; personal digital assistants; telephones; satellite mobile telephones; mobile telephones; videophones; cameras; satellite and/or Global Positioning System (GPS) navigation systems; emergency tracking beacons; electrically-powered personal tracking devices; electrically-powered sirens; radios; LED signaling flares; laser signaling flares; electrically-powered signaling flares; and electrically-powered water filtration or purification devices. Such devices comprising may be particularly useful in an emergency situation such as when a natural disaster arises for the following reasons:

(a) by integrally forming the battery as part of the device itself, this alleviates the time required to insert batteries in to the device; and (b) the integrally built-in battery (and hence the device) is able to be activated more rapidly if it is an embodiment in which the compressed electrolyte powder mixture within the battery casing chamber includes disintegrant type particle;

(c) the integrally built-in battery (and hence the device) is able to be activated more rapidly if it is one of the aforementioned embodiments having an internally-stored supply of water, KOH etc for user-controllable release (e.g. by turning the second end cap), to interact with another constituent in the casing chamber to provide an electrolyte within the chamber that is suitable for operation of the battery in powering the device; and (d) the integrally built-in battery (and hence the device) may assist in providing a hard-wired and more reliable electrical connectivity from the battery terminals to power the device.

In certain embodiments in which the battery is integrally-built in to the device, the device may include suitable water-proofing barriers to prevent inadvertent leakage of liquids into the device electronics from the battery casing, or from an external source if the battery casing is being filled with the liquid from the external source.

In certain embodiments the device may be configured to be powered by multiple batteries some of which may be integrally in-built and some of which may not. Certain devices may be configured for electrical coupling with aforementioned battery embodiments in modular fashion so that the aforementioned battery embodiments may be replaced once expired.

In certain embodiments, the battery may be as described in any of the aforementioned manners and configurations with a further modification in that the cathode and anode elements of the battery are reversed.

In yet alternate embodiments, a battery is provided comprising an integrally-formed switch, said switch being configured for user-controlled operation between at least one of an inactive state in which the battery is not operable to power a load device coupled to terminals of the battery, and, an active state in which the battery is operable to power the load device. Typically, the ability to adjust the switch between active and inactive states may be embodied by any mechanism in the aforementioned embodiments in which a first and a second constituent are controllably interacted with each other within the casing chamber so that an electrolyte is provided in the chamber which is suitable for operation of the battery. When the first and second constituents are separated, the switch is arranged in the inactive state. When the first and second constituents are interacted together by user-control, the switch is adjusted in to the active state. In yet alternate embodiments, the switch may purely comprise purely of mechanical, electrical, chemical switching elements or any combination thereof to enable a user to controllably activate the battery. For instance, a battery may be configured such that by applying a force to an outer portion of the battery (e.g. by rotating or depressing an end portion), such force may actuate movement of mechanical switching elements to effect electrical connectivity within the battery necessary for operation of the battery to deliver power to a load device.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A battery including:

first and second battery terminals configured for electrical communication with a load;

a battery casing having first and second end portions and a chamber disposed therein;

a first constituent, a second constituent, a solid spacer element, and at least one barrier arranged in a first configuration within the chamber, wherein the at least one barrier restricts the first constituent from interacting with the second constituent, wherein the solid spacer element comprises a disk-shape with an aperture disposed centrally and sized for a rod to fit therethrough, and the solid spacer element is positioned within the chamber between the first constituent and a permeable separator sheet, and whereby, responsive to a force being applied to a portion of the battery, the at least one barrier is configured for arrangement into a second configuration from the first configuration so that the first constituent and the second constituent are able to interact with each other to provide an electrolyte within the chamber, wherein the first constituent includes at least one of manganese dioxide, iron oxide, or crystalline silver oxide, wherein the chamber includes first and second compartments configured for containing the first and second constituents, respectively, wherein the second compartment is located adjacent to the second end portion of the battery casing, wherein:

the at least one barrier includes a wall separating the first and second compartments;

the wall separating the first and second compartments comprises a first rigid planar disc and a second rigid planar disc;

the first rigid planar disc comprises a first plurality of holes and the second rigid planar disc comprises a second plurality of holes;

the first plurality of holes and the second plurality of holes are non-aligned in the first configuration such that the first constituent is restricted from interacting with the second constituent; and the first plurality of holes and the second plurality of holes are aligned in the second configuration such that the first constituent and the second constituent are able to interact with each other.

2. The battery as claimed in claim 1, wherein the second constituent includes at least one of a potassium hydroxide solution, a zinc chloride solution, or water.

3. The battery as claimed in claim 1, wherein the force applied to the portion of the battery so that the at least one barrier is configured for arrangement into the second configuration from the first configuration includes at least one of:

(a) rotating a first portion of the battery casing relative to a second portion of the battery casing; and (b) sliding a first portion of the battery casing relative to a second portion of the battery casing.

4. The battery as claimed in claim 1, wherein the first constituent includes a powder composition comprising disintegrant particles.

5. The battery as claimed in claim 4, wherein the powder composition includes a compressed powder composition.

6. The battery as claimed in claim 1, further including:

a conductive layer disposed within the chamber adjacent an inner surface of the battery casing, the conductive layer being configured for electrical communication with the first battery terminal;

the permeable separator sheet disposed within the chamber and configured to electrically separate the electrolyte when provided within the chamber from the conductive layer; and a conductive rod having a first end configured for electrical communication with the second battery terminal, and a second end configured for contacting with the electrolyte when provided within the chamber.

7. The battery as claimed in claim 1, wherein the first battery terminal and the second battery terminal are disposed on the first and second end portions of the casing, respectively.

8. The battery as claimed in claim 1, wherein the battery casing includes a polymeric material.

9. The battery as claimed in claim 1, wherein the battery casing is formed by at least one of extrusion moulding and injection moulding.

10. The battery as claimed in claim 1, wherein the second rigid planar disc is coupled to the second end portion of the battery casing.

* * * * *